(12) United States Patent
Tsai et al.

(10) Patent No.: US 10,634,866 B2
(45) Date of Patent: Apr. 28, 2020

(54) LENS AND MANUFACTURING METHOD THEREOF

(71) Applicant: Rays Optics Inc., Hsinchu County (TW)

(72) Inventors: Chen-Yi Tsai, Hsinchu County (TW); Chen-Cheng Lee, Hsinchu County (TW)

(73) Assignee: Rays Optics Inc., Hsinchu County (TW)

( * ) Notice: Subject to any disclaimer, the term of this patent is extended or adjusted under 35 U.S.C. 154(b) by 161 days.

(21) Appl. No.: 16/039,356

(22) Filed: Jul. 19, 2018

(65) Prior Publication Data

US 2019/0346652 A1    Nov. 14, 2019

(30) Foreign Application Priority Data

May 11, 2018    (TW) .............................. 107116199 A (51) Int. Cl.
*G02B 7/02*       (2006.01)
*G02B 9/60*       (2006.01)

(52) U.S. Cl.
CPC .............. *G02B 7/021* (2013.01); *G02B 9/60* (2013.01)

(58) Field of Classification Search
CPC .................................. G02B 7/021; G02B 9/60
USPC ......................................................... 359/763
See application file for complete search history.

(56) References Cited

U.S. PATENT DOCUMENTS

| 8,331,040 B2 | 12/2012 | Iwasawa et al. |
| 2010/0232040 A1* | 9/2010 | Iwasawa ................ G02B 7/021 |
| | | 359/784 |

FOREIGN PATENT DOCUMENTS

| CN | 202975443 | 6/2013 |
| JP | 4017752 | 12/2007 |
| TW | 201116872 | 5/2011 |
| TW | 201516480 | 5/2015 |
| WO | 2011158462 | 12/2011 |

OTHER PUBLICATIONS

"Office Action of Taiwan Counterpart Application," dated Nov. 27, 2018, p. 1-p. 4.

* cited by examiner

*Primary Examiner* — James R Greece
(74) *Attorney, Agent, or Firm* — JCIPRNET (57) ABSTRACT

A lens including a lens barrel and five lens elements is provided. A relation between the amount of field curvature variation Sa1 of a system caused by a thickness tolerance of a lens element in the lens and an amount of field curvature variation Sa2 of the system caused by a change of a gap between the lens element and an adjacent lens element thereof is described as follows. Sa2 is twice or less of Sa1. Sa2 and Sa1 are both positive values or both negative values to render a better field curvature performance of the lens. A manufacturing method of the lens is also provided.

20 Claims, 5 Drawing Sheets

LENS AND MANUFACTURING METHOD THEREOF

CROSS-REFERENCE TO RELATED APPLICATION

This application claims the priority benefit of Taiwan application serial no. 107116199, filed on May 11, 2018. The entirety of the above-mentioned patent application is hereby incorporated by reference herein and made a part of this specification.

BACKGROUND OF THE INVENTION

1. Field of the Invention

The invention relates to an optical device and a manufacturing method of the optical device, and particularly relates to a lens and a manufacturing method of the lens.

2. Description of Related Art

It is common to assemble lens elements by stacking the lens elements directly into a lens barrel. However, in reality, the designs of sizes of the respective lens elements in the lens are not as accurate and precise as in the initial design due to the influences of factors such as tolerance due to processing or measurement factors. Therefore, there may be errors in the actual sizes when the lens finished its assembly process. Also, the tolerance of the interval among the lens elements in a lens may result in field curvature in the end product. Generally speaking, the actual size of a lens element is controlled within a permitted variable range in the actual practice, and the permitted variation of size is referred to as dimensional tolerance. When assembling a lens barrel, if the lens elements are stacked directly, the dimensional tolerance of thicknesses of the lens elements may accumulate, which may lead to a significant field curvature in the image projected by the lens which the optical quality may not be desirable. One known way to solve the said problem, is to use lenses having smaller tolerance band. However, it may result in additional manufacturing cost.

SUMMARY OF THE INVENTION

Exemplary embodiments of a lens according to the invention provide a design capable of improving the field curvature performance of the lens without the necessity of reducing tolerance band of lens elements and a manufacturing method of the lens.

A lens according to an embodiment of the invention includes a lens barrel and five lens elements disposed in the lens barrel. The five lens elements may at least be divided into two combinations of components referred to as a first composition and a second composition.

The first composition includes two lens elements, referred to as a first lens element and a second lens element. It is set that D1 is a thickness of any one (for example, the first lens element) of the lens elements of the first composition in an optical axis direction. It is set that D2 is a minimum distance between the first lens element and the second lens element adjacent to the first lens element on the optical axis. It is set that S1 is an amount of field curvature of the lens or a variation of distance of the lens at a focal point of an off-axis position caused every time when the thickness D1 is changed by one unit. It is set that S2 is an amount of field curvature of the lens or a variation of distance of the lens at the focal point of the off-axis position caused every time when the distance D2 is changed by one unit.

Moreover, when S2 is twice or less of S1 and/or S2 and S1 are both positive values or both negative values, the first lens element and the second lens element is disposed onto and contact with different supporting surfaces inside the lens barrel. Since the first lens element and the lens element are neither separated by a spacer (or say, separating block) nor connected directly with each other, the positions of the respective lens elements will not be affected by the change of thicknesses thereof. Therefore, the manufacturing tolerances of the two lens elements do not affect each other since there are separated. Accordingly, the amounts of field curvature generated by the respective lens elements due to the tolerance do not accumulate. As a result, the field curvature of the lens can be reduced.

Besides, the second composition includes two lens elements, referred to a third lens element and a fourth lens element. It is set that D3 is a thickness of any one (for example, the third lens element) of the lens elements of the second composition in the optical axis direction. It is set that D4 is a minimum distance between the third lens element and the fourth lens element adjacent to the third lens element along the optical axis. It is set that S3 is an amount of field curvature of the lens or a variation of distance of the lens at the focal point of the off-axis position caused every time when the thickness D3 is changed by one unit. It is set that S4 is an amount of field curvature of the lens or a variation of distance of the lens at the focal point of the off-axis position caused every time when the distance D4 is changed by one unit. S3 and S4 may respectively be positive or negative values.

Moreover, when S3 is twice or less of S4 and/or S3 and S4 are not both positive values or both negative values, the third lens element and the fourth lens element may be separated by a separating block/spacer or may be directly stacked to each other. Under the conditions described above, since the field curvature performance is better when the third lens element and the fourth lens element are stacked than when the third lens element and the fourth lens element are disposed separately, the field curvature performance of the lens is further improved. Meanwhile, in numerical ranges such as "a number or more" and "a number or less" in the invention, the "number" is covered in the numerical ranges.

An embodiment of the invention provides a manufacturing method of a lens. The manufacturing method includes Steps A, B, C, D, and E as follows.

At Step A, a first lens element is fixed to a first supporting surface of a lens barrel.

At Step B, a second lens element is fixed in the lens barrel.

At Step C, a third lens element adjacent to the second lens element is fixed in the lens barrel. A thickness of the second lens element in an optical axis direction is D1. A distance of the second lens element to the third lens element in the optical axis direction is D2. S1 is a variation of distance of a focal point of the lens at an off-axis position, caused by every unit of variation of the thickness D1. S2 is a variation of distance of a focal point of the lens at an off-axis position, caused by every unit of variation of the thickness D2. When S2 is twice or less of S1, the third lens element is fixed to a second supporting surface of the lens barrel. When S2 is twice or more of S1, a first spacer is disposed into the lens barrel before fixing the third lens element into the lens barrel. In the embodiment, the order among Steps A, B, and C are freely adjustable in accordance with different compositions of the lens barrel, and is not limited to start with Step A and end with Step C.

At Step D, a relation for a fourth lens element adjacent to the third lens element is determined based on Step C to decide whether to dispose another spacer between the third lens element and the fourth lens element or fix the fourth lens element to another supporting surface of the lens barrel when fixing the fourth lens element to the lens barrel.

At Step E, Step C is repeated to dispose a fifth lens element adjacent to the fourth lens element in the lens barrel. The manufacturing method of the lens at least includes a spacer and a second supporting surface.

Based on the above, in one embodiment, in the lens and the manufacturing method of the lens according to the embodiments of the invention, the design of the lens is determined based on the amounts of distance variation of the respective parameters of the lens at the focal point of the off-axis position due to the tolerance. The lens and the manufacturing method of the lens may capable of effectively improving the field curvature performance and thereby rendering a relatively desirable optical quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
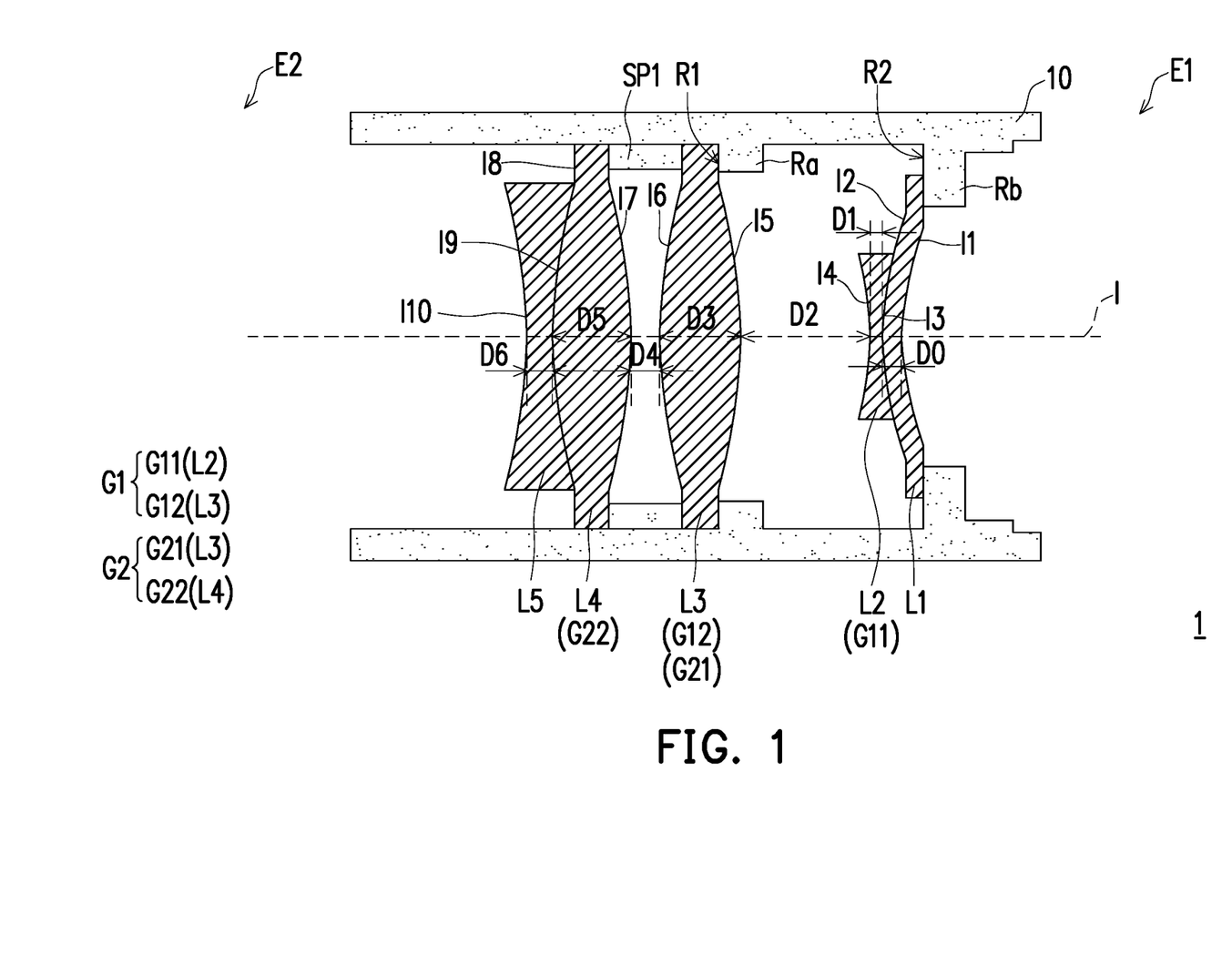
FIG. 1 is a schematic view illustrating a lens according to an embodiment of the invention.
Figure 2:
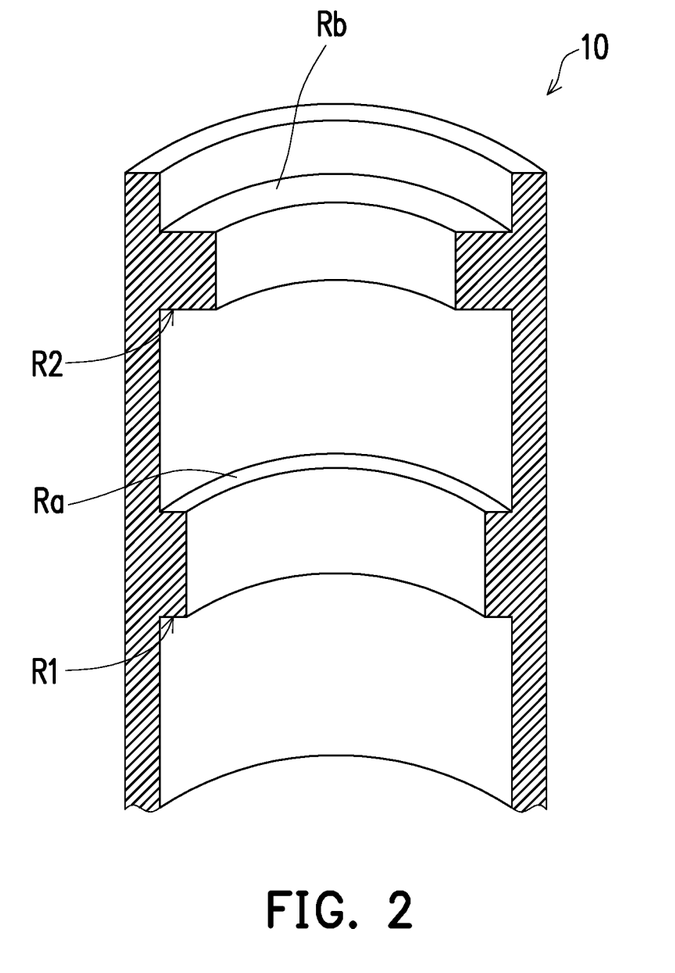
FIG. 2 is a simplified schematic cross-sectional view illustrating the lens barrel of FIG. 1.
Figure 3:
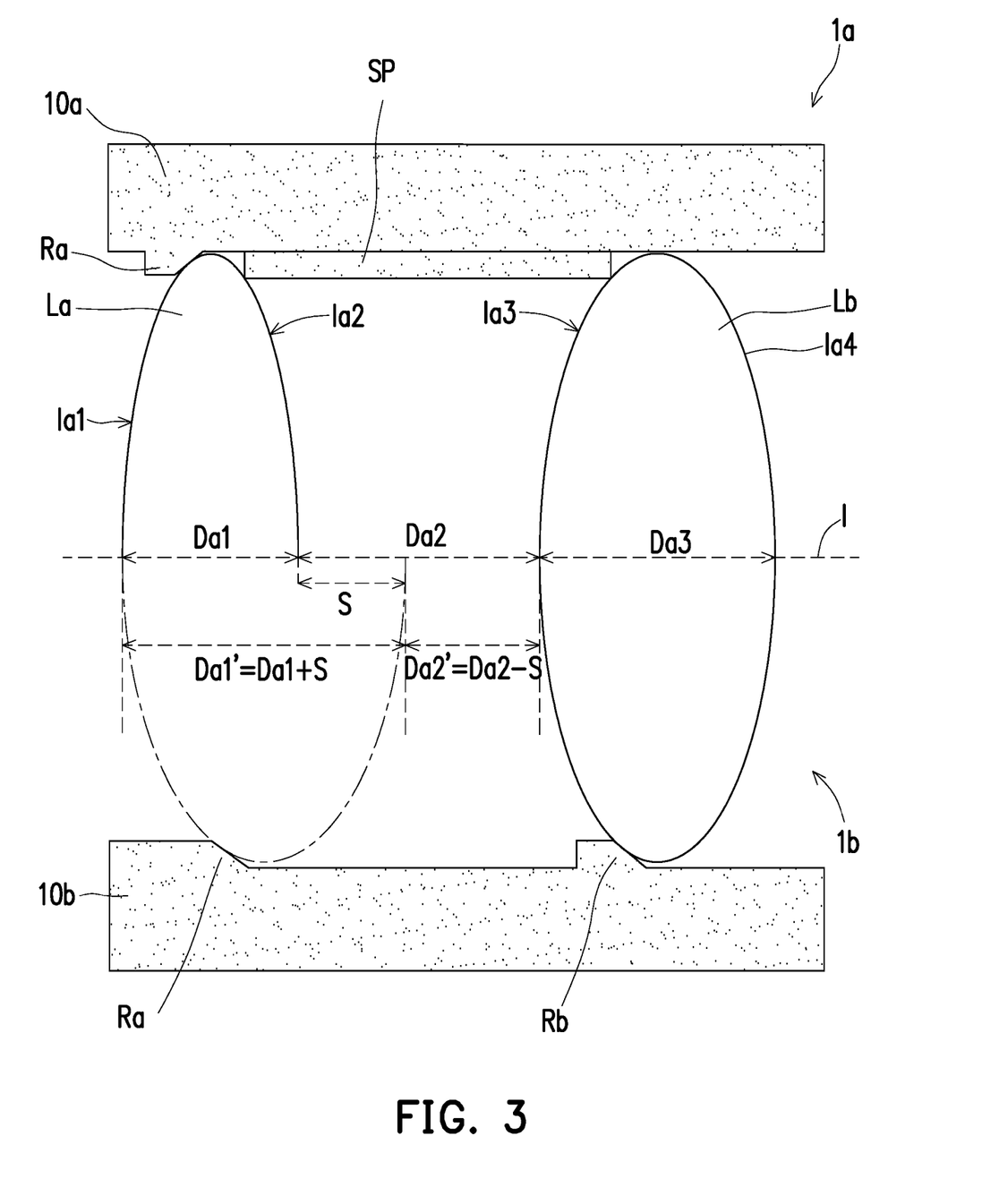
FIGS. 3 to 4 are schematic views illustrating multiple different lens designs according to the embodiments of the invention.
Figure 4:
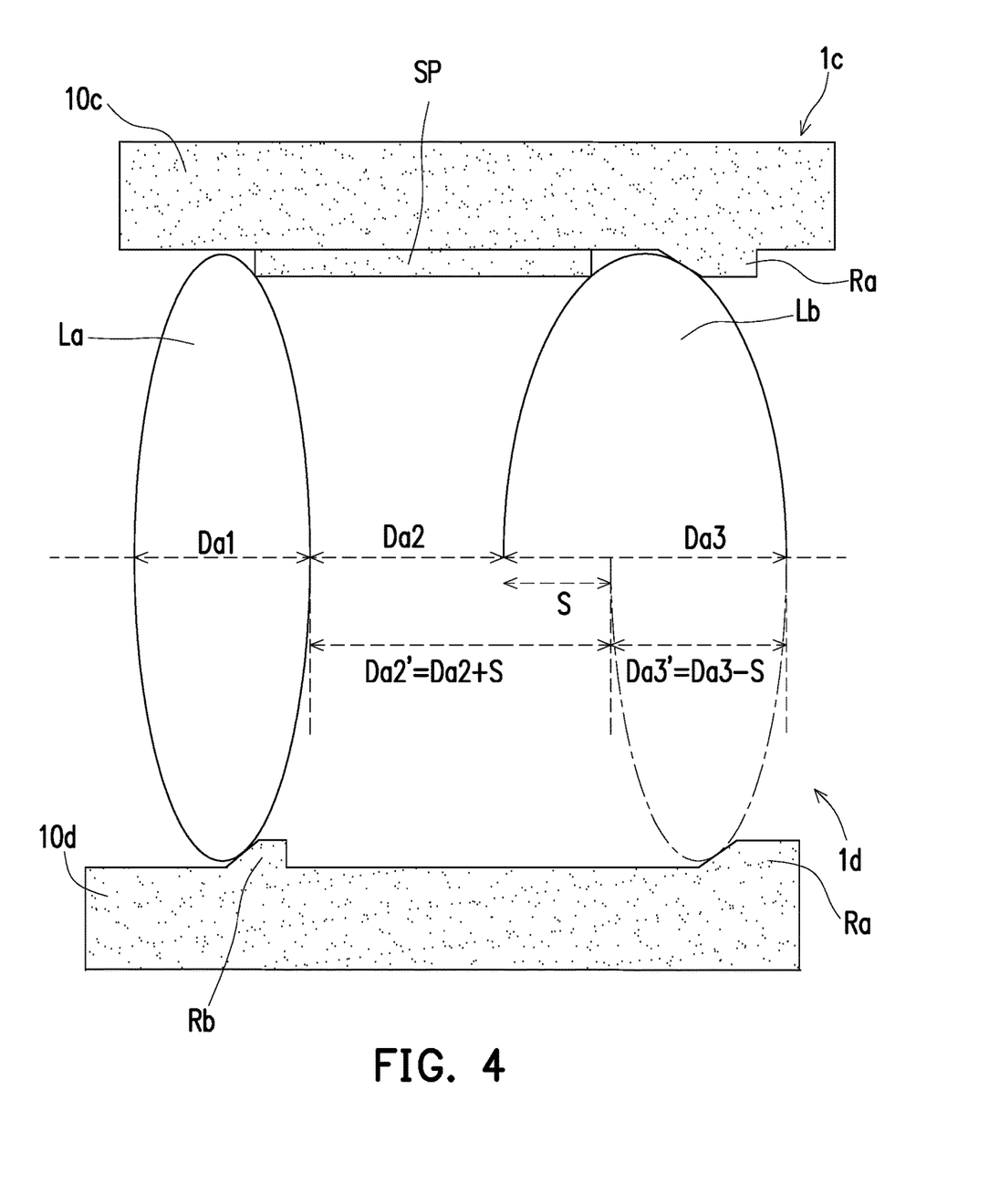

FIG. 1 is a schematic view illustrating a lens according to an embodiment of the invention. FIG. 2 is a simplified schematic cross-sectional view illustrating the lens barrel of FIG. 1. FIGS. 3 to 4 are schematic views illustrating multiple different lens designs according to the embodiments of the invention.

Referring to FIG. 1, in the present embodiment, a lens 1 has an optical axis I and includes a lens barrel 10, five lens elements L1 to L5, and a spacer SP1. Combinations of the aforementioned components of lens elements and spacers may be considered as a composition G1 (a first composition) and a composition G2 (a second composition). In the following, the components in the lens 1 are described respectively.

The lens barrel indicated in the embodiment refers to an element for accommodating lens elements therein. The lens barrel 10 has a supporting part Ra and a supporting part Rb. The supporting part indicated in the embodiment refers to a element or structure for preventing a lens element from being horizontally movable in a lens barrel. The supporting part may be, for example, a protrusion, a recess, or a mechanism, the supporting part may in various shapes. Referring to FIG. 2, in the embodiment, the supporting parts Ra and Rb are annular ribs shaped structure formed in the lens barrel 10. The supporting part Ra has a supporting surface R1, and the supporting part Rb has a supporting surface R2. In the embodiment, the supporting surface R1 is a first supporting surface, for example, and the supporting surface R2 is a second supporting surface, for example.

In the embodiment, a lens element refers to an optical element which at least one of a light inputting surface and a light outputting surface thereof is a non-planar surface, or at least one of the light inputting surface and the light outputting surface is capable of refracting light beams (also referred to as having refractive power or diopter).

In the embodiment, each of the compositions G1 and G2 is a combination of components and includes one or more lens elements or may include a device such as a spacer, a spacing element or like.

In the embodiment, the composition G1 may be referred to as the first composition, for example, and includes the lens elements L2 and L3. The lens element L2 is a "first lens element of a first lens set" G11, and the lens element L3 is a "second lens element of the first lens set" G12.

The composition G2 may be referred to as the second composition, for example, and includes the lens elements L3 and L4. The lens element L3 is a "first lens element of a second lens set" G21 and the lens element L4 is a "second lens element of the second lens set" G22 or a fourth lens element.

In the embodiment of FIG. 1, the number of lens elements is five. However, the invention is not limited thereto. In other examples, the number of lens elements may be less than 15, less than 12, or less than 7, for a desirable, more desirable, and even more desirable cost merit.

The spacer (a kind of spacing element) in the present embodiment refers to an element for separating or connecting lens elements in the lens barrel to ensure or maintain a distance between two adjacent lens elements separated thereby. For example, the spacer is a connection ring, a soma, or any element that is not transparent which can provide the aforementioned function of separation or connection. In the present embodiment, the spacer SP1 is a connection ring.

In the embodiment, the lens barrel 10 has a first end E1 and a second end E2 opposite to the first end E1. The five lens elements L1 to L5 are sequentially arranged along the optical axis I of the lens 1 in a direction from the first end E1 to the second end E2 in the lens barrel 10. The lens element L1 contacts with and is fixed to the supporting surface R2. The lens element L3 contacts with and is fixed to the supporting surface R1. The spacer SP1 is provided between the lens element L3 and the lens element L4. The spacer SP1 prevents an interval between the lens element L3 and the lens element L4 from being affected by the tolerance of thicknesses of the lens elements. The lens element L3 is adjacent to the lens element L2 and the lens element L4. In the embodiment, when the composition G1 and the composition G2 are adjacent to each other, the second lens element of any one of the sets is the first lens element of the other set. In the embodiment, the second lens element G12 of the first lens set is the first lens element G21 of the second lens set. It should be noted that, the surface shapes, interval, or thicknesses of the respective lens elements in FIG. 1 are only shown for an illustrative purpose and shall not be construed as limitations.

To clearly illustrate the optical effect of the lens 1 shown in FIG. 1 and the manufacturing method of the lens, the following paragraphs will describe the composition of the lens with reference to FIGS. 3 to 4 and relevant tables.

Referring to FIG. 3, for the ease of illustration, the upper half and the lower half of FIG. 3 respectively represent the designs of different lens 1a and 1b. Specifically, the lens 1a of the upper half of FIG. 3 is designed as follows. A lens element La and a lens element Lb are connected via a spacer SP, and the lens element La is connected to the supporting part Ra of a lens barrel 10a. In the design, the variation of the thickness of the lens element La affect the position of the lens element Lb. It should be noted that when an object X is "connected to" another object Y, the object X and object Y may be directly or indirectly connected, and is not limited to direct contact. Moreover, when an object X is connected to another object Y "via" object Z, it is optionally comprises one or more object disposed between object both X and Z, and X and Y.

The lens 1b of the lower half of FIG. 3 is designed as follows. A lens barrel 10b comprises supporting parts Ra and Rb and no spacer is utilized, which the position of the lens element Lb is not affected by the variation of the thickness of the lens element La. The other part (not shown) of the lens 1a of the upper half of FIG. 3 may be derived based on the symmetry with respect to the optical axis I. Similarly, the other part (not shown) of the lens 1b of the lower half of FIG. 3 may be derived based on the symmetry with respect to the optical axis I. The upper half of the lens element La (in solid lines) shown in FIG. 3 is in a state where the tolerance of the lens element La is zero, and the lower half of the lens element La (in broken lines) is in a state where the lens element La has a tolerance valve of S.

In addition, referring to Table 1 below, the data shown in Table 1 represents the amount of variation of the field curvature, when other parameters of the lens is assumed to remain the same. Moreover, the field curvature is measured at a position of 0.8 field of view of an image projected by the lens when the thickness of a specific lens element of the lens has a tolerance value of S. For the ease of description, the following refer to the above data as "amount of field curvature variation". It should be noted that, in other embodiments, the amount of field curvature variation may also be measured at a position of 0.2 field of view, 0.4 field of view, 0.6 field of view, or other positions of field of view. The invention is not limited to the above. The term "field curvature" is a widely used term and also referred to as "curvature of field". For example, if a lens element has field curvature, the focal point of the whole beam does not overlap with the ideal image point. Even though a clear image point is rendered at each specific point, the whole image plane is a curved surface. A greater value of field curvature indicates a greater horizontal distance between the actual focal point of a ray in a specific field of view and the central focal point. In other words, the field curvature represents a degree of curvature of an imaging plane of a system, which is also referred to as a horizontal distance to an ideal imaging plane when the off-axis focal point is in a specific field of view. The positive/negative property of the value indicates the direction of the distance. In the embodiment, the amount of field curvature being a positive value indicates that the focal point is away from the imaging plane and toward a light receiving direction, while the amount of field curvature being negative indicates the opposite. The positive/negative property and the corresponding directions may be reversed in correspondence with the use of the lens. The above descriptions are also applicable for the positive/negative property of the amount of field curvature variation.

For clarity, the respective parameters in Table 1 and FIG. 3, surfaces related to the respective parameters are described in the following. A surface of the lens element La farthest from the lens element Lb is an interface Ia1, a surface of the lens element La closest to the lens element Lb is an interface Ia2, a surface of the lens element Lb closest to the lens element La is an interface Ia3, and a surface of the lens element Lb farthest from the lens element La is an interface Ia4. Then, the respective important parameters are defined as follows:

the thickness of the lens element La in the direction of the optical axis I is Da1, which is the distance between the interface Ia1 and the interface Ia2 on the optical axis I;

the distance of the lens element La to the lens element Lb in the direction of the optical axis I is Da2, which is the distance between the interface Ia1 and the interface Ia2 on the optical axis I; and the thickness of the lens element Lb in the direction of the optical axis I is Da3, which is the distance between the interface Ia3 and the interface Ia4 on the optical axis I.

Table 1 is as follows:

TABLE 1

| Lens parameter | Amount of field curvature variation of a lens caused if the interval is increased by S units (+S) due to tolerance | Amount of field curvature variation of a lens caused if the interval is decreased by S units (−S) due to tolerance |
| --- | --- | --- |
| Da1 | +3 (Sa1) | −3 (Sa1) |
| Da2 | +5 (Sa2) | −5 (Sa2) |
| Da3 | −4 (Sa3) | +4 (Sa3) |

"+3" in the field of Table 1 indicates that, when the thickness Da1 of the lens element La is increased by S units due to the tolerance, the amount of field curvature variation is plus three, and "−5" in the field indicates that, when the distance Da2 is decreased by S units due to the tolerance, the amount of field curvature variation is minus five. Other fields in Table 1 may be interpreted in a similar manner. Thus, details in this regard will not be repeated in the following. In addition, it is assumed that the amount of field curvature variation of the thickness Da1 is Sa1, the amount of field curvature of the distance Da2 is Sa2, and the amount of field curvature of the thickness Da3 is Sa3. According to Table 1, Sa2 is twice or less of Sa1. In addition, Sa1 and Sa2 are both positive values or both negative values.

Referring to the upper half of FIG. 3 and Table 1, if the design of the lens 1a with the spacer SP is adopted, and a thickness Da1' of the lens element La is increased by S units (i.e., Da1'=Da1+S) due to tolerance, the positions of the spacer SP and the lens element Lb may be translated S units rightward (not shown) because the thickness Da1' of the lens element La is increased by S units, and the distance Da2 remains the same because of the spacer SP. At this time, the total amount of field curvature variation of the whole lens element 1a is: 3 (Da1', variation of +S)+0 (Da2, no variation)+0 (Da3, no variation)=3.

Referring to the lower half of FIG. 3 and Table 1, if the design where the lens has the supporting parts Ra and Rb is adopted, when the thickness Da1' of the lens element La is increased by S units (Da1'=Da1+s), a distance Da2' is shortened to Da2-S. At this time, the total amount of field curvature variation of the whole lens element 1a is: 3 (Da1', variation of −S)−5 (Da2', variation of −S)+0 (Da3, no variation)=−2.

In the case of Table 1, the absolute value of the total amount of field curvature variation of the respective parameters of the lens 1a is 3, and the absolute value of the total amount of field curvature variation of the respective parameters of the lens 1b is 2. Therefore, the design of the lens 1b (with the supporting parts Ra and Rb) is more desirable than the design of the lens 1a (with the spacer SP). More specifically, in the design of the lens element 1b, the variation of the thickness Da1' and the variation of the distance Da2' due to the tolerance S are opposite to each other, and the corresponding amounts of field curvature variation caused accordingly are also opposite to each other. Namely, by adopting the design of the lens 1b (with the supporting parts Ra and Rb), the amounts of field curvature variation may be cancelled out by each other. Meanwhile, since Sa2 is twice or less of Sa1, the value resulting from cancelling out the amounts of field curvature variation is not greater than Sa1 (Sa2−Sa1<Sa1).

Referring to Table 2, the definitions of relevant data in Table 2 are similar to those of Table 1. Therefore, details in this regard will not be repeated in the following. It should be noted that Table 2 differs from Table 1 in that, even though Sa1 and Sa2 are both positive values, the amount (+8) of the field curvature of the distance Da2 is twice or more of the amount (+3) of the field curvature of the thickness Da1.

TABLE 2

| Lens parameter | Amount of field curvature variation of a lens caused if the interval is increased by S units (+S) due to tolerance | Amount of field curvature variation of a lens caused if the interval is decreased by S units (−S) due to tolerance |
| --- | --- | --- |
| Da1 | +3 (Sa1) | −3 (Sa1) |
| Da2 | +8 (Sa2) | −8 (Sa2) |
| Da3 | −4 (Sa3) | +4 (Sa3) |

Referring to the upper half of FIG. 3 and Table 2, if the design of the lens 1a with the spacer SP is adopted, and the thickness Da1' of the lens element La is increased by S units (i.e., Da1'=Da1+S) due to the tolerance, the total amount of field curvature variation of the respective parameters of the whole lens 1a is: 3 (Da1', variation of +S)+0(Da2, no variation)+0(Da3, no variation)=3.

Referring to the lower half of FIG. 3 and Table 2, if the design of the lens 1b with the supporting parts Ra and Rb is adopted, and the thickness Da1' of the lens element La is increased by S units (i.e., Da1'=Da1+S) due to the tolerance, the total amount of field curvature variation of the respective parameters of the whole lens 1b is: 3 (Da1', variation of +S)+(−8) (Da2, variation of −S)+0(Da3, no variation)=−5.

In the case of Table 2, the absolute value of the total amount of field curvature variation of the lens 1a is 3, and the absolute value of the total amount of field curvature variation of the lens 1b is 5. Therefore, the design of the lens 1a (with the supporting parts Ra and Rb) is more desirable than the design of the lens 1b (with the spacer SP). More specifically, even though when the design of the lens 1b is adopted, the amounts of field curvature variation may be cancelled out by each other, the lens generates field curvature in an amount greater than Sa1 (i.e., Sa2−Sa1>Sa1) during the process of cancelling out the amounts of field curvature since Sa2 is twice or more of Sa1. Alternatively, if the design of the lens 1a is adopted, since the spacer SP prevents parameters other than the thickness Da1' from being affected by the tolerance, only the amount of field curvature variation of the lens element La (i.e., Sa1) needs to be considered for the field curvature of the whole lens 1a.

Referring to FIG. 4 and Table 3, lenses 1c and 1d of FIG. 4 and respective parameters of the lenses 1c and 1d are similar to the lenses and the parameters of FIG. 3. The main difference therebetween is that the lens element La shown in FIG. 4 is in a state with a tolerance of zero, and the lens element Lb is in a state with a tolerance of −S. The upper half of the lens element Lb (in solid lines) is in a state where the lens element Lb does not have a tolerance, and the lower half of the lens element Lb is in a state where the lens element Lb has a tolerance of −S. The definitions of Table 3 are similar to those of Tables 1 and 2. Therefore, details in this regard will not be repeated in the following. It should be noted that one of Sa2 and Sa3 is a positive value, and the other is a negative value.

TABLE 3

| Lens parameter | Amount of field curvature variation of a lens caused if the interval is increased by S units (+S) due to tolerance | Amount of field curvature variation of a lens caused if the interval is decreased by S units (−S) due to tolerance |
| --- | --- | --- |
| Da1 | +3 (Sa1) | −3 (Sa1) |
| Da2 | +5 (Sa2) | −5 (Sa2) |
| Da3 | −4 (Sa3) | +4 (Sa3) |

Referring to the upper half of FIG. 4 and Table 3, if the design of the lens 1c with the spacer SP is adopted, and a thickness Da3' of the lens element Lb is decreased by S units (i.e., Da3'=Da1−S) due to the tolerance, the positions of the spacer SP and the lens element La may be translated S units rightward (not shown) because the thickness Da3' of the lens element Lb is decreased by S units. The distance Da2 remains the same. At this time, the total amount of field curvature variation of the whole lens 1c is: 0 (Da1, no variation)+0 (Da2, no variation)+4 (Da3', variation of −S)=4.

Referring to the lower half of FIG. 4 and Table 3, if the design of the lens 1d with the supporting parts Ra and Rb is adopted, and the thickness Da3' of the lens element Lb is decreased by S units (i.e., Da3'=Da3−S) due to the tolerance, the distance Da2' between the lens element La and the lens element Lb is increased to Da2+S because of the tolerance S. At this time, the total amount of field curvature variation of the whole lens element 1d is: 0(Da1, no variation)+5 (Da2', variation of +S)+4 (Da3', variation of −S)=9.

In the case of Table 3, the absolute value of the total amount of field curvature variation of the respective parameters of the lens 1c is 4, and the absolute value of the total amount of field curvature variation of the respective parameters of the lens 1d is 9. Therefore, in the case of Table 3, the design adopting the lens 1c is more desirable than the design of the lens 1d. More specifically, since Sa2 and Sa3 are in an opposite relation where one of Sa2 and Sa3 is a positive value and the other is a negative value, if the design of the lens 1d is adopted, the variation of the thickness Da3' and the variation of the distance Da2' due to the tolerance S are also opposite, causing the amounts of the field curvature variation accumulating toward the same direction and unable to be cancelled out by each other. Thus, the field curvature of the lens becomes higher. Alternatively, if the design of the lens 1c is adopted, since the spacer SP prevents parameters other than the thickness Da3' from being affected due to the tolerance, only the amount of field curvature variation of the lens element Lb (i.e., Sa1) needs to be considered for the field curvature of the whole lens 1c.

The descriptions above demonstrate the judging criterion for the lens design according to the embodiments of the invention. Specifically, under the condition that the lens elements La and Lb adjacent to each other have the distance Da2 therebetween, if the amount of field curvature variation Sa2 of the distance Da2 is twice or less of the amount of field curvature variation Sa2 of the thickness Da1 of the lens element La, and the amounts of field curvature variation Sa1 and Sa2 are both positive values or both negative values, then the lens elements La and Lb are separated by respectively leaning against different surfaces in the lens barrel.

If the amount of field curvature variation Sa2 of the distance Da2 is twice or more of the amount of field curvature variation Sa1 of the thickness Da1 of the lens element La, or one of the amount of field curvature variation Sa2 and the amount of field curvature variation Sa1 is a positive value and the other is a negative value, the lens elements La and Lb may be linked with a spacer or stacked directly. In brief, according to the embodiments of the invention, different lens designs may be adopted for the amounts of field curvature variation of different parameters of the lens, so as to effectively deal with the field curvature.

In the following, the manufacturing method and the optical effect of the lens 1 shown in FIG. 1 are described in detail with reference to Table 4. To clearly define the respective parameters in Table 4 and FIG. 1, the related surfaces in the respective parameters are described in advance. Specifically, the surface of the lens element L1 most distant from the lens element L2 is an interface I1. The surface of the lens element L1 closest to the lens element L2 is an interface I2. The surface of the lens element L2 most distant from the lens element L3 is an interface I3. The surface of the lens element L2 closest to the lens element L3 is an interface I4. The surface of the lens element L3 most distant from the lens element L4 is an interface I5. The surface of the lens element L3 most closest to the lens element L4 is an interface I6. The surface of the lens element L4 most distant from the lens element L5 is an interface I7. The surface of the lens element L4 closest to the lens element L5 is an interface I8. The surface of the lens element L5 closest to the lens element L4 is an interface I9. The surface of the lens element L5 most distant from the lens element L4 is an interface I10. Then, the respective important parameters are defined as follows:

the thickness of the lens element L1 in the direction of the optical axis I is D0, which is the distance between the interface I1 and the interface I2 on the optical axis I;

the thickness of the lens element L2 in the direction of the optical axis I is D1, which is the distance between the interface I3 and the interface I4 on the optical axis I;

the distance of the lens element L2 to the lens element L3 in the direction of the optical axis I is D2, which is the distance between the interface I4 and the interface I5 on the optical axis I;

the thickness of the lens element L3 in the direction of the optical axis I is D3, which is the distance between the interface I5 and the interface I6 on the optical axis I;

the distance of the lens element L3 to the lens element L4 in the direction of the optical axis I is D4, which is the distance between the interface I6 and the interface I7 on the optical axis I;

the thickness of the lens element L4 in the direction of the optical axis I is D5, which is the distance between the interface I7 and the interface I8 on the optical axis I; and the thickness of the lens element L5 in the direction of the optical axis I is D6, which is the distance between the interface I9 and the interface I10 on the optical axis I.

In addition, it is further defined that:

S0 is the amount of field curvature variation of the thickness D0;

S1 is the amount of field curvature variation of the thickness D1;

S2 is the amount of field curvature variation of the distance D2;

S3 is the amount of field curvature variation of the thickness D3;

S4 is the amount of field curvature variation of the distance D4;

S5 is the amount of field curvature variation of the thickness D5; and

S6 is the amount of field curvature variation of the thickness D6.

Table 4 is as follows:

TABLE 4

| Lens parameter | Amount of field curvature variation of a lens caused if the interval is increased by S units (+S) due to tolerance | Amount of field curvature variation of a lens caused if the interval is decreased by S units (−S) due to tolerance |
| --- | --- | --- |
| D0 | 1 (S0) | −1 (S0) |
| D1 | 7 (S1) | −7 (S1) |
| D2 | 10 (S2) | −10 (S2) |
| D3 | 9 (S3) | −9 (S3) |
| D4 | 19 (S4) | −19 (S4) |
| D5 | 2 (S5) | −2 (S5) |
| D6 | 1 (S6) | −1 (S6) |

In the embodiment, since the lens element L2 is cemented to the lens element L1, for example, there is no distance between the lens element L2 and the lens element L1. The same applies to the lens element L5 and L4. The lens elements (L1 and L2/L5 and L4) are stacked to each other. Therefore, no further details will be described below.

The distance D2 is provided between the lens element L2 and the lens element L3. Judging by the above design criterion, as the amount of field curvature variation S2 is twice or less of the amount of field curvature variation S1, and the amounts of field curvature variation S1 and S2 have a consistent positive/negative property, it is more desirable to separate the lens element L2 and the lens element L3 with the supporting part Ra.

The distance D4 is provided between the lens element L3 and the lens element L4. Judging by the above design criterion, the amount of field curvature variation S4 is twice or more of the amount of field curvature variation S3. Therefore, it is more desirable to separate the lens elements L3 and L4 by disposing the spacer SP1.

In the above lens element 1, if the thicknesses D1, D3, and D5 all have the tolerance+S, the total amount of field curvature variation of the whole lens 1 according to Table 4 is: 7(D1, variation of +S)+(−10)(D2, variation of −S)+9(D3, variation of +S)+(0)(D4, no variation for D4 due to the spacer SP1)+2(D5, variation of +S)=8.

If the thicknesses D1, D3, and D5 all have the tolerance S, and the conventional lens design is adopted, i.e., the lens elements L2 and L3 and the lens elements L3 and L5 are directly stacked by using spacing elements, for example, to separate the lens elements, the total amount of field curvature variation of the whole lens according to Table 4 is: 7(D1, variation of +S)+(0)(D2, no variation for D2 due to the spacing element)+9(D3, variation of +S)+(0)(D4, no variation for D4 due to the spacing element)+2(D5, variation of +S)=18.

Referring to Table 4 and FIG. 1, the following paragraphs will describe the manufacturing method of the lens 1 shown in FIG. 1 in detail.

A. The lens element L1 is fixed on the supporting surface R2 of the lens barrel 10.

B. The lens element L2 is fixed in the lens barrel 10. In the embodiment, the lens element L2 is indirectly fixed to the lens barrel 10 by being cemented to the lens element L1.

C. The lens element L3 adjacent to the lens element L2 is fixed in the lens barrel 10. When the amount of field curvature variation S2 of the distance D2 is twice or less of the amount of field curvature variation S1 of the thickness D1, the lens element L3 is fixed to the supporting surface R1 of the lens barrel 10. When the amount of field curvature variation S2 of the distance D2 is twice or more of the amount of field curvature variation S1 of the thickness D1, the spacer SP1 is disposed in the lens barrel 10, and then the lens element L3 is fixed in the lens barrel 10. Referring to Table 4, since S2 is 10 and S1 is 7, it is judged based on Step C that S2 is twice or less of S1, so the lens element L2 and the lens element L3 are separated by the supporting part Ra.

D. The relation for the lens element L4 adjacent to the lens element L3 is determined according to Step C to decide how to fix the lens element L4 in the lens barrel 10. Specifically, whether to dispose another spacer between the lens element L3 and the lens element L4 or fix the lens element L4 to another supporting surface of the lens barrel 10 is determined. In the embodiment, S3 is 9 and S4 is 19. It is judged based on Step C that S4 is twice or more of S3, so the spacer SP1 is disposed between the lens element L3 and the lens element L4 to separate the lens element L3 and the lens element L4.

E. The lens element L5 is fixed in the lens barrel 10. In the embodiment, the lens element L5 is indirectly fixed to the lens barrel 10 by being cemented to the lens element L4, for example. The manufacturing method of the lens at least includes the spacer SP1 and the supporting surface R1.

Based on the above, the absolute value of the total amount of the respective parameters of the lens 1 in FIG. 1 is 8, and the absolute value of the amounts of field curvature variation of the respective parameters of the lens based on the conventional art is 18. Thus, the lens 1 of the embodiment is capable of effectively improving the field curvature from the conventional art.

The following embodiment incorporates part of the contents of the previous embodiments, and for details of elements referred to with the same names or symbols, reference can be found in the previous embodiments.

Figure 5:
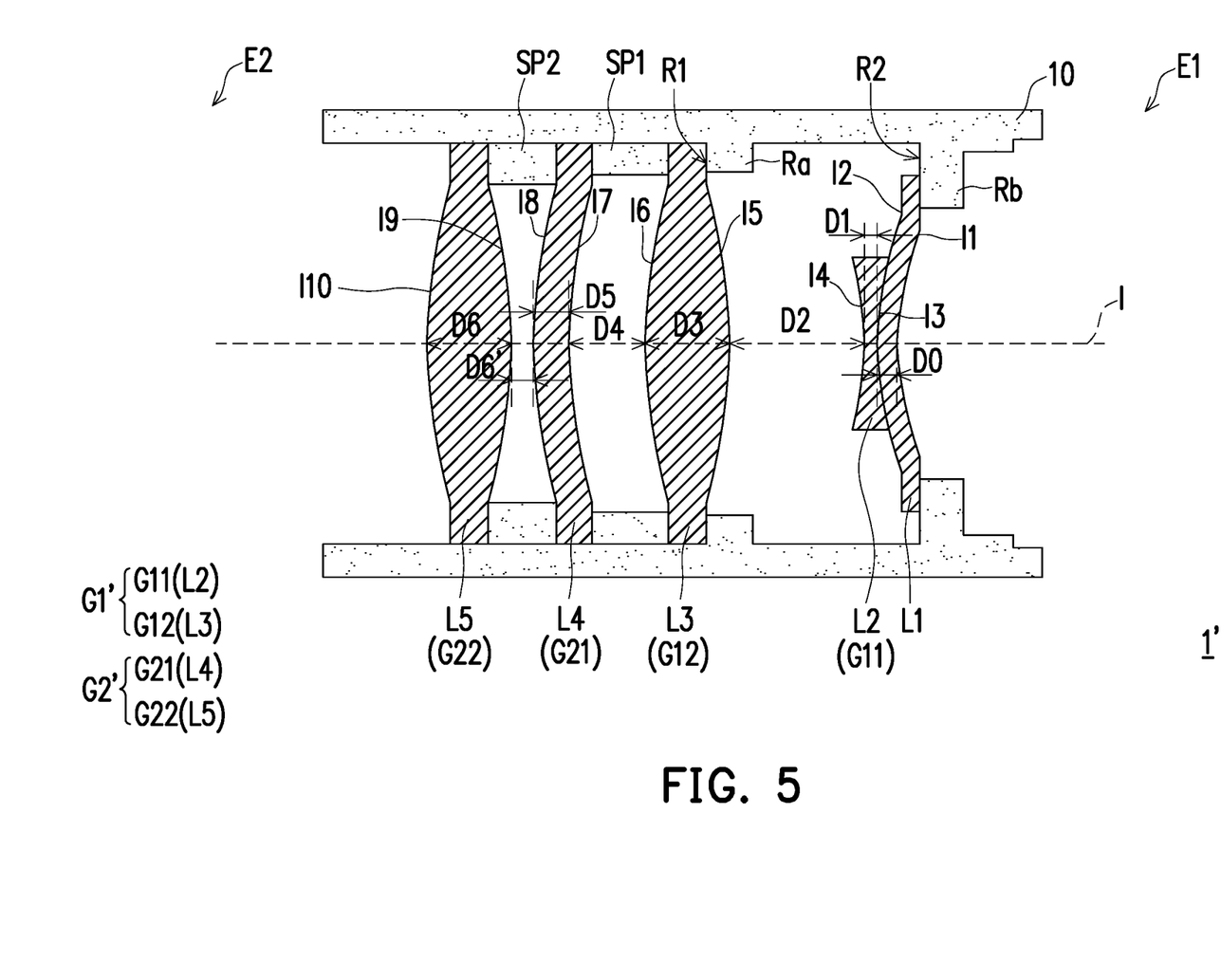
FIG. 5 is a schematic view illustrating a lens according to another embodiment of the invention.

FIG. 5 is a schematic view illustrating a lens according to another embodiment of the invention. Referring to FIG. 5, a lens 1' shown in FIG. 5 is substantially similar to the lens 1 of FIG. 1. The main difference therebetween lies in that a composition G1' in the lens 1' includes the lens elements L2 and L3. A composition G2' includes the lens elements L4 and L5. The lens element L2 is the first lens element G11 of the first lens set or the second lens element, for example. The lens element L3 is the second lens element G12 of the first lens set or the third lens element, for example. The lens element L4 is the first lens element G21 of the second lens set or the fourth lens element, for example. The lens element L5 is the second lens element G22 of the second lens set or the fifth lens element, for example. In the embodiment, the second lens element G12 of the first lens set and the first lens element G21 of the second lens set are lens elements independent from each other. In addition, the lens elements L4 and L5 keep a distance from each other, instead of being cemented to each other.

In the following, the manufacturing method and the optical effect of the lens 1' shown in FIG. 5 are described in detail with reference to Table 5. To clearly define the respective parameters in Table 5 and FIG. 5, the related surfaces in the respective parameters are described in advance. Nevertheless, most surfaces and important parameters of the lens 1' in FIG. 5 are similar to the surfaces and the important parameters of the lens 1 in FIG. 1, and thus will not be repeated in the following. In addition to the important parameters above, another important parameters is defined as follows:

the distance of the lens element L4 to the lens element L5 in the direction of the optical axis I is D6', which is the distance between the interface I8 and the interface I9 on the optical axis I.

In addition, it is further defined that:

S6' is the amount of field curvature variation of the distance D6'.

Table 5 is as follows:

TABLE 5

| Lens parameter | Amount of field curvature variation of a lens caused if the interval is increased by S units (+S) due to tolerance | Amount of field curvature variation of a lens caused if the interval is decreased by S units (−S) due to tolerance |
|---|---|---|
| D0 | 1 (S0) | −1 (S0) |
| D1 | 7 (S1) | −7 (S1) |
| D2 | 10 (S2) | −10 (S2) |
| D3 | 9 (S3) | −9 (S3) |
| D4 | 19 (S4) | −19 (S4) |
| D5 | 2 (S5) | −2 (S5) |
| D6' | 6 (S6') | −6 (S6') |
| D6 | 1 (S6) | 1 (S6) |

In FIG. 5, the design between the lens elements L2 and L3 and between the lens elements L3 and L4 is similar to the design of FIG. 1, and thus will not be repeated in the following.

The distance D6' is provided between the lens element L4 and the lens element L5. Judging by the above design criterion, the amount of field curvature variation S6' is twice or more of the amount of field curvature variation S5. Therefore, it is more desirable to separate the lens elements L3 and L5 by disposing a spacer SP2.

Referring to Table 5 and FIG. 5, the following paragraphs will describe the manufacturing method of the lens 1' shown in FIG. 5 in detail.

Steps A to D are substantially similar to the steps in the manufacturing method of the lens shown in FIG. 1, and thus will not be repeated in the following.

E. Step C is repeated to dispose the lens element L5 adjacent to the lens element L4. In the embodiment, S5 is 2 and S6' is 6. It is judged based on Step C that S6' is twice or more of S5, and the spacer SP2 is disposed between the lens element L4 and the lens element L5 to separate the lens element L4 and the lens element L5.

In the above lens 1', if the thicknesses D1, D3, and D5 all have the tolerance+S, the total amount of field curvature variation of the whole lens 1' according to Table 5 is: 7(D1, variation of +S)+(−10)(D2, variation of −S)+9(D3, variation of +S)+(0)(D4, no variation for D4 due to the spacer SP1)+2(D5, variation of +S)+(0)(D6', no variation for D6' due to the spacer SP2)=8.

If the thicknesses D1, D3, and D5 all have the tolerance S, and the conventional lens design is adopted, i.e., the lens elements L2 and L3, the lens elements L3 and L4, and the lens elements L4 and L5 are respectively stacked directly by using spacing elements, for example, to separate the lens elements, the total amount of field curvature variation of the whole lens according to Table 5 is: 7(D1, variation of +S)+(0)(D2, no variation for D2 due to the spacing element)+9(D3, variation of +S)+(0)(D4, no variation for D4 due to the spacing element)+2(D5, variation of +S)+(0)(D6', no variation for D6' due to the spacing element)=18.

Based on the above, the absolute value of the total amount of field curvature variation of the respective parameters of the lens 1' in FIG. 5 is 8, and the absolute value of the amounts of field curvature variation of the respective parameters of the lens based on the conventional art is 18. Thus, the lens 1' of the embodiment is capable of effectively improving the field curvature from the conventional art.

In view of the foregoing, in the lens and the manufacturing method of the lens according to the embodiments of the invention, the design of the lens is determined based on the amounts of distance variation of the respective parameters of the lens at a focal point of an off-axis position due to the tolerance. The lens and the manufacturing method of the lens are capable of effectively improving the field curvature in a simpler way and thereby rendering a desirable optical quality.

It will be apparent to those skilled in the art that various modifications and variations can be made to the composition of the present invention without departing from the scope or spirit of the invention. In view of the foregoing, it is intended that the present invention cover modifications and variations of this invention provided they fall within the scope of the following claims and their equivalents.

What is claimed is:

1. A lens, comprising:
    a lens barrel;
    five lens elements, disposed in the lens barrel, the five lens elements comprising:
        a first composition, comprising a first lens element of a first lens set and a second lens element of the first lens set adjacent to each other, wherein a thickness of the first lens element of the first lens set in an optical axis direction is D1, a distance of the first lens element of the first lens set to the second lens element of the first lens set in the optical axis direction is D2, a variation of distance of the lens at a focal point of an off-axis position caused when the thickness D1 is changed by one unit is S1, and a variation of distance of the lens at an off-axis focal point when the distance D2 is changed by one unit is S2, S2 is twice or less of S1, and the second lens element of the first lens set is separated from the first lens element of the first lens set by a first supporting surface; and
        a second composition, comprising a first lens element of a second lens set and a second lens element of the second lens set adjacent to each other, wherein a thickness of the first lens element of the second lens set in the optical axis direction is D3, a distance of the first lens element of the second lens set to the second lens element of the second lens set in the optical axis direction is D4, a variation of distance of the lens at the focal point of the off-axis position caused when the thickness D3 is changed by one unit is S3, and a variation of distance of the lens at the focal point of the off-axis position when the distance D4 is changed by one unit is S4, S4 is twice or larger of S3, and the first lens element of the second lens set is separated from the second lens element of the second lens set by a first spacer.

2. The lens as claimed in claim 1, wherein the second lens element of the first lens set and the first lens element of the second lens set are the same lens element.

3. The lens as claimed in claim 1, wherein the second lens element of the first lens set and the first lens element of the second lens set are lens elements independent from each other.

4. The lens as claimed in claim 1, wherein the lens barrel comprises the first supporting surface formed on a protruding rib inside the lens barrel.

5. The lens as claimed in claim 1, wherein S1 and S2 are both positive values or both negative values.

6. The lens as claimed in claim 1, wherein the number of lens elements having diopter in the lens is 15 or less.

7. The lens as claimed in claim 1, wherein the lens has an optical axis, the five lens elements are disposed along the optical axis, and the optical axis direction is an extending direction of the optical axis.

8. The lens as claimed in claim 1, wherein the first spacer fixes the distance of the first lens element of the second lens set to the second lens element of the second lens set in the optical axis direction.

9. A lens, comprising:
    a lens barrel, having a first supporting surface and a second supporting surface disposed inside the lens barrel; and
    five lens elements, disposed in the lens barrel, wherein the five lens elements comprise a first lens element and a second lens element adjacent to the first lens element, the first lens element is connected with the lens barrel via the first supporting surface, and the second lens element is connected with the lens barrel via the second supporting surface,
    wherein D1 is a thickness of the first lens element on an optical axis, D2 is a distance of the first lens element to the second lens element on the optical axis, S1 is a variation of distance of the lens at a focal point of an off-axis position caused every time when D1 is changed by one unit, and S2 is a variation of distance of the lens at an off-axis focal point caused every time when D2 is changed by one unit, S2 of the lens is twice or less of S1, and S2 and S1 are both positive values or both negative values.

10. The lens as claimed in claim 9, wherein the number of lens elements having diopter in the lens is 15 or less.

11. The lens as claimed in claim 9, wherein the lens has the optical axis, the five lens elements are disposed along the optical axis.

12. A manufacturing method of a lens, comprising:
    A. fixing a first lens element to a first supporting surface of a lens barrel;
    B. fixing a second lens element in the lens barrel;
    C. fixing a third lens element adjacent to the second lens element in the lens barrel,
    wherein
    a thickness of the second lens element in an optical axis direction is D1,
    a distance of the second lens element to the third lens element in the optical axis direction is D2,
    a variation of distance of the lens at a focal point of an off-axis position caused when the thickness D1 is changed by one unit is S1, a variation of distance of the lens at the off-axis focal point caused when the distance D2 is changed by one unit is S2, when S2 is twice or less of S1, the third lens element is fixed to a second supporting surface of the lens, and when S2 is twice or more of S1, a first spacer is disposed in the lens barrel, and then the third lens element is fixed in the lens barrel;

D. determining a relation for a fourth lens element adjacent to the third lens element based on Step C to decide whether to dispose another spacer between the third lens element and the fourth lens element or fix the fourth lens element to another supporting surface of the lens barrel; and E. repeating Step C to dispose a fifth lens element adjacent to the fourth lens element in the lens barrel, wherein the manufacturing method of the lens at least comprises a spacer and a second supporting surface.

13. The manufacturing method of the lens as claimed in claim 12, wherein the second lens element and the third lens element form a first composition, the third lens element and the fourth lens element form a second composition, and the first composition is adjacent to the second composition.

14. The manufacturing method of the lens as claimed in claim 12, wherein the second lens element and the third lens element form a first composition, and the fourth lens element and the fifth lens element form a second composition.

15. The manufacturing method of the lens as claimed in claim 12, wherein the number of lens elements having diopter in the lens manufactured according to the manufacturing method of the lens is 15 or less.

16. The manufacturing method of the lens as claimed in claim 12, wherein S1 and S2 are both positive values or both negative values.

17. The manufacturing method of the lens as claimed in claim 12, wherein the lens manufactured according to the manufacturing method of the lens has an optical axis, and the first lens element, the second lens element, the third lens element, the fourth lens element and the fifth lens element are disposed along the optical axis, and the optical axis direction is an extending direction of the optical axis.

18. The manufacturing method of the lens as claimed in claim 12, wherein the first spacer fixes the distance of the second lens element to the third lens element in the optical axis direction.

19. The manufacturing method of the lens as claimed in claim 12, wherein the lens barrel has a first supporting part having the first supporting surface and a second supporting part having the second supporting surface.

20. The manufacturing method of the lens as claimed in claim 19, wherein the first supporting part and the second supporting part protrude inside the lens barrel.

* * * * *